No. 879,558.

PATENTED FEB. 18, 1908.

J. W. LEDOUX.
AUTOMATIC FLOW CONTROLLER.
APPLICATION FILED JULY 11, 1907.

WITNESSES:

INVENTOR
John W. Ledoux
BY
Chas. N. Butler
ATTORNEY.

UNITED STATES PATENT OFFICE.

JOHN W. LEDOUX, OF SWARTHMORE, PENNSYLVANIA, ASSIGNOR TO SIMPLEX VALVE & METER COMPANY, OF CAMDEN, NEW JERSEY, A CORPORATION OF NEW JERSEY.

AUTOMATIC FLOW-CONTROLLER.

No. 879.558.     Specification of Letters Patent.     Patented Feb. 18, 1908.

Application filed July 11, 1907. Serial No. 383,189.

*To all whom it may concern:*

Be it known that I, JOHN W. LEDOUX, a citizen of the United States, residing at Swarthmore, in the county of Delaware and State of Pennsylvania, have invented an Automatic Flow-Controller, of which the following is a specification.

This invention relates to means for automatically regulating the flow of fluids to a predetermined rate.

It is designed particularly for controlling the flow of water discharged from filters, when it is desired to maintain a predetermined rate of flow regardless of the variations in head.

The leading object is to provide a simple, inexpensive and efficient mechanism controlled by variations in the head to control the flow.

Figure 1:
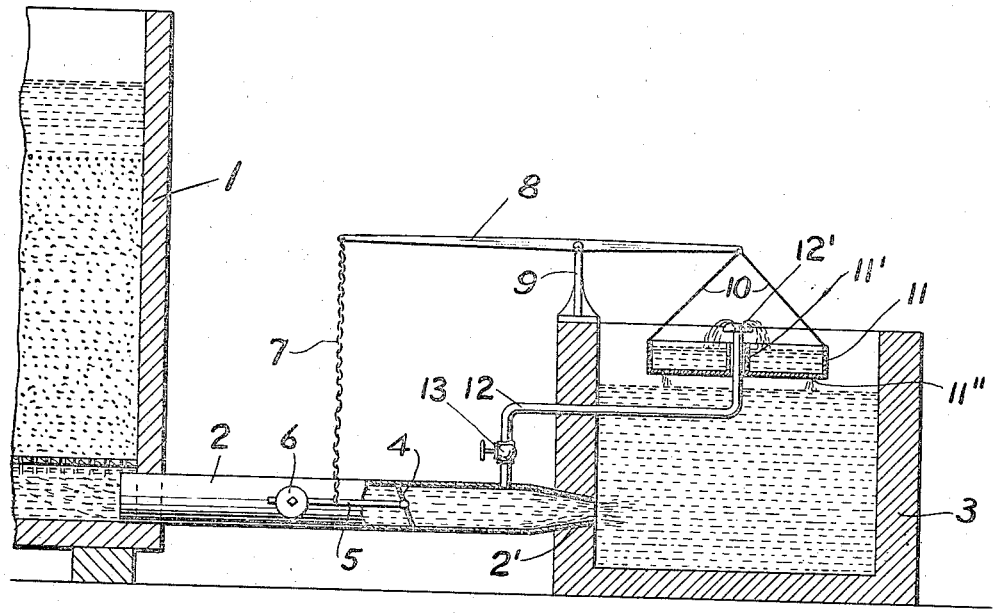
Figure 2:
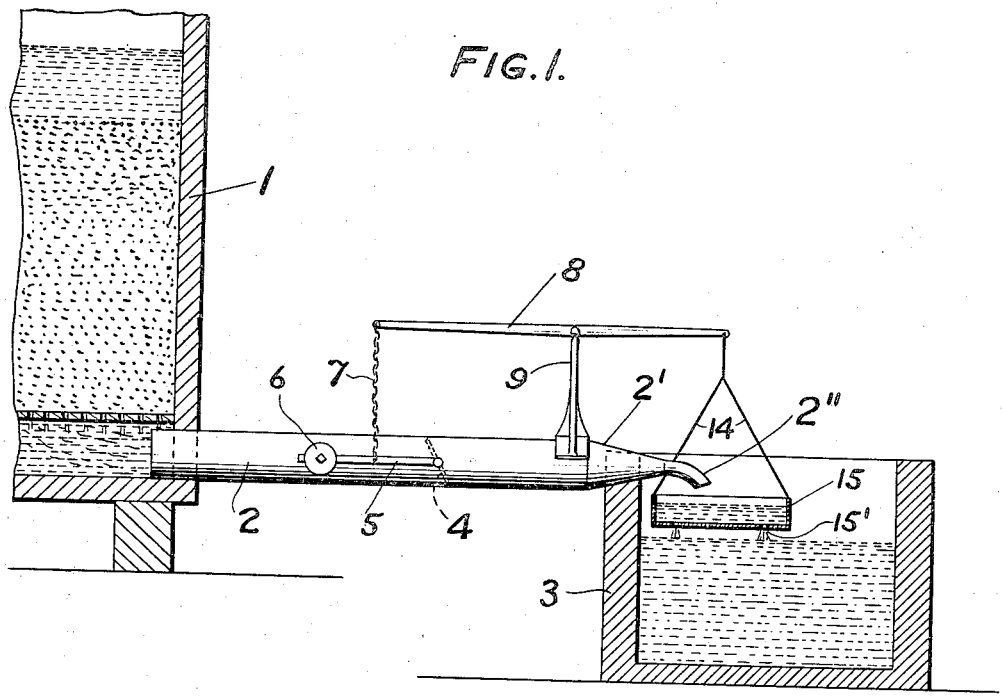

In the accompanying drawings, Figure 1 is a sectional elevation representing a form of the invention, and Fig. 2 is a sectional elevation representing a second form thereof.

As shown in the drawings, the filter 1 discharges water by the conduit 2 into the effluent chamber 3, the conduit having the restricted outlet or nozzle 2'. In the conduit is journaled the balanced valve 4 to which is fixed a lever 5 having the adjustable poise 6 thereon. The lever 5 is connected by a coupling as a chain 7 with an arm of a lever 8, which is balanced on the standard 9.

As shown in Fig. 1, the balanced lever 8 has an arm, connected by the coupling 10 with a vessel 11, which tends to close the valve. A tube 12, controlled by a valve 13, provides a restricted passage connecting the conduit 2, at a point in the rear of its outlet, with the vessel 11, the outlet end of the tube passing through a nipple 11' which rises from the bottom of the vessel and moves freely on the tube section passing therethrough. The tube is provided with a lip 12' for directing liquid into the vessel and the vessel is provided with the bottom orifices 11''.

A portion of the water flowing in the conduit passes through the tube into the vessel from which it flows continuously through the bottom orifices into the effluent chamber. The amount of water or variable load in the vessel will depend upon the head or pressure inducing flow through the tube and will regulate the position of the valve, the latter being fully open with the minimum head and gradually closing as the pressure or head rises so that the water accumulates in the vessel.

As shown in Fig. 2, the lever 8 has an arm thereof connected by a coupling 14 with a vessel 15 having orifices 15' in its bottom. The nozzle 2' discharges the whole of the water through the spout or restricted passage 2'' into the vessel, the water flowing thence through the orifices 15' into the effluent chamber. With the minimum pressure or head the valve is fully open and as the flow increases so as to lower the vessel the valve is closed proportionately.

Having described my invention, I claim:

1. The combination of a conduit, a valve for controlling said conduit, a vessel into which said conduit discharges, and mechanism whereby the load in said vessel regulates said valve so as to maintain a substantially uniform rate of flow through said conduit.

2. The combination of a valve, a vessel having a restricted outlet for continuously discharging a liquid delivered thereto, and mechanism whereby the load in said vessel regulates the position of said valve.

3. The combination of a conduit, a balanced vessel having an outlet through which its variable load discharges continuously and automatically, and means whereby the position of said vessel controls the flow through said conduit.

4. The combination of a conduit, a valve in said conduit, a fulcrumed lever connected with said valve, and a vessel connected with said vessel having a constantly open outlet and said lever, said conduit discharging into said vessel.

5. The combination of a filter, an effluent chamber, a conduit connecting said filter with said chamber, a valve controlling said conduit, a vessel, and balancing mechanism connecting said valve and vessel whereby the load in said vessel regulates said valve.

6. The combination of a filter, with a conduit having a contracted passage connected therewith, an effluent chamber to which said conduit discharges, a valve for controlling said conduit, a vessel with one or more discharge openings into which said contracted passage discharges, and balancing mechanism connecting said valve and vessel.

In testimony whereof I have hereunto set my name this 6th day of July, 1907, in the presence of the subscribing witnesses.

JOHN W. LEDOUX.

Witnesses:
ROBERT JAMES EARLEY,
JAS. G. DENNY, Jr.